US010336199B2

(12) United States Patent
Herzog et al.

(10) Patent No.: US 10,336,199 B2
(45) Date of Patent: Jul. 2, 2019

(54) ARRANGEMENT OF AN INDUCTION COIL ON AN UNDERBODY OF A MOTOR VEHICLE

(71) Applicant: Bayerische Motoren Werke Aktiengesellschaft, Munich (DE)

(72) Inventors: Torsten Herzog, Munich (DE); Bernd Nurtsch, Gars-Bahnhof (DE); Andreas Birkholz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 273 days.

(21) Appl. No.: 15/185,103

(22) Filed: Jun. 17, 2016

(65) Prior Publication Data

US 2016/0297306 A1   Oct. 13, 2016

Related U.S. Application Data

(63) Continuation of application No. PCT/EP2014/077191, filed on Dec. 10, 2014.

(30) Foreign Application Priority Data

Dec. 20, 2013 (DE) .................. 10 2013 226 830

(51) Int. Cl.
    *B60L 11/18*    (2006.01)
    *B60L 3/00*     (2019.01)
    *H02J 7/02*     (2016.01)
    *B62D 35/02*    (2006.01)
    (Continued)

(52) U.S. Cl.
    CPC ........... *B60L 11/182* (2013.01); *B60L 3/0023* (2013.01); *B60L 53/12* (2019.02); *B60R 13/04* (2013.01); *B62D 35/02* (2013.01); *Y02T 10/7005* (2013.01); *Y02T 10/7072* (2013.01); *Y02T 10/82* (2013.01); *Y02T 10/88* (2013.01); *Y02T 90/122* (2013.01); *Y02T 90/14* (2013.01)

(58) Field of Classification Search
    CPC ...... B60L 11/182; B60L 3/0023; B60R 13/04; B62D 35/02; H02J 7/025
    USPC .......................................... 320/108; 307/104
    See application file for complete search history.

(56) References Cited

U.S. PATENT DOCUMENTS

| 4,800,328 | A |   | 1/1989 | Bolger et al. |
| 9,751,415 | B2 | * | 9/2017 | Czainski ................. H01F 27/36 |

(Continued)

FOREIGN PATENT DOCUMENTS

| CN |     102695629 A | 9/2012 |
| DE | 10 2010 028 428 A1 | 11/2011 |

(Continued)

OTHER PUBLICATIONS

International Search Report (PCT/ISA/210) issued in PCT Application No. PCT/EP2014/077191 dated Feb. 18, 2015 with English translation (eight pages).

(Continued)

*Primary Examiner* — M Baye Diao
(74) *Attorney, Agent, or Firm* — Crowell & Moring, LLP

(57) ABSTRACT

An arrangement is provided for at least one induction coil for inductively charging an energy accumulator on an underbody of a motor vehicle. The induction coil is covered in the vertical direction of the vehicle, towards the base, at least partially by at least one cover element.

12 Claims, 5 Drawing Sheets

(51) Int. Cl.
*B60R 13/04* (2006.01)
*B60L 53/12* (2019.01)

(56) References Cited

U.S. PATENT DOCUMENTS

| 2010/0065352 | A1* | 3/2010 | Ichikawa | B60L 11/182 |
| | | | | 180/65.8 |
| 2011/0181240 | A1 | 7/2011 | Baarman et al. | |
| 2012/0235636 | A1 | 9/2012 | Partovi | |
| 2014/0327394 | A1 | 11/2014 | Asselin et al. | |
| 2015/0290373 | A1* | 10/2015 | Rudser | A61M 1/1086 |
| | | | | 623/3.27 |
| 2016/0143194 | A1* | 5/2016 | Yanagida | B60L 11/1833 |
| | | | | 307/104 |

FOREIGN PATENT DOCUMENTS

| DE | 10 2011 108 544 A1 | 2/2012 |
| DE | 10 2010 042 395 A1 | 4/2012 |
| DE | 10 2011 001 633 A1 | 10/2012 |
| DE | 10 2011 054 541 A1 | 4/2013 |
| DE | 10 2012 103 322 A1 | 10/2013 |
| JP | 2012-257445 A | 12/2012 |
| WO | WO 2013/056879 A1 | 4/2013 |
| WO | WO 2013/150365 A2 | 10/2013 |

OTHER PUBLICATIONS

German-language Written Opinion (PCT/ISA/2237) issued in PCT Application No. PCT/EP2014/077191 dated Feb. 18, 2015 (seven pages).

German Search Report issued in counterpart German Application No. 10 2013 226 830.0 dated Mar. 21, 2014 with partial English translation (10 pages).

Chinese-language Office Action issued in counterpart Chinese Application No. 201480065224.9 dated Feb. 1, 2018 with English translation (12 pages).

\* cited by examiner

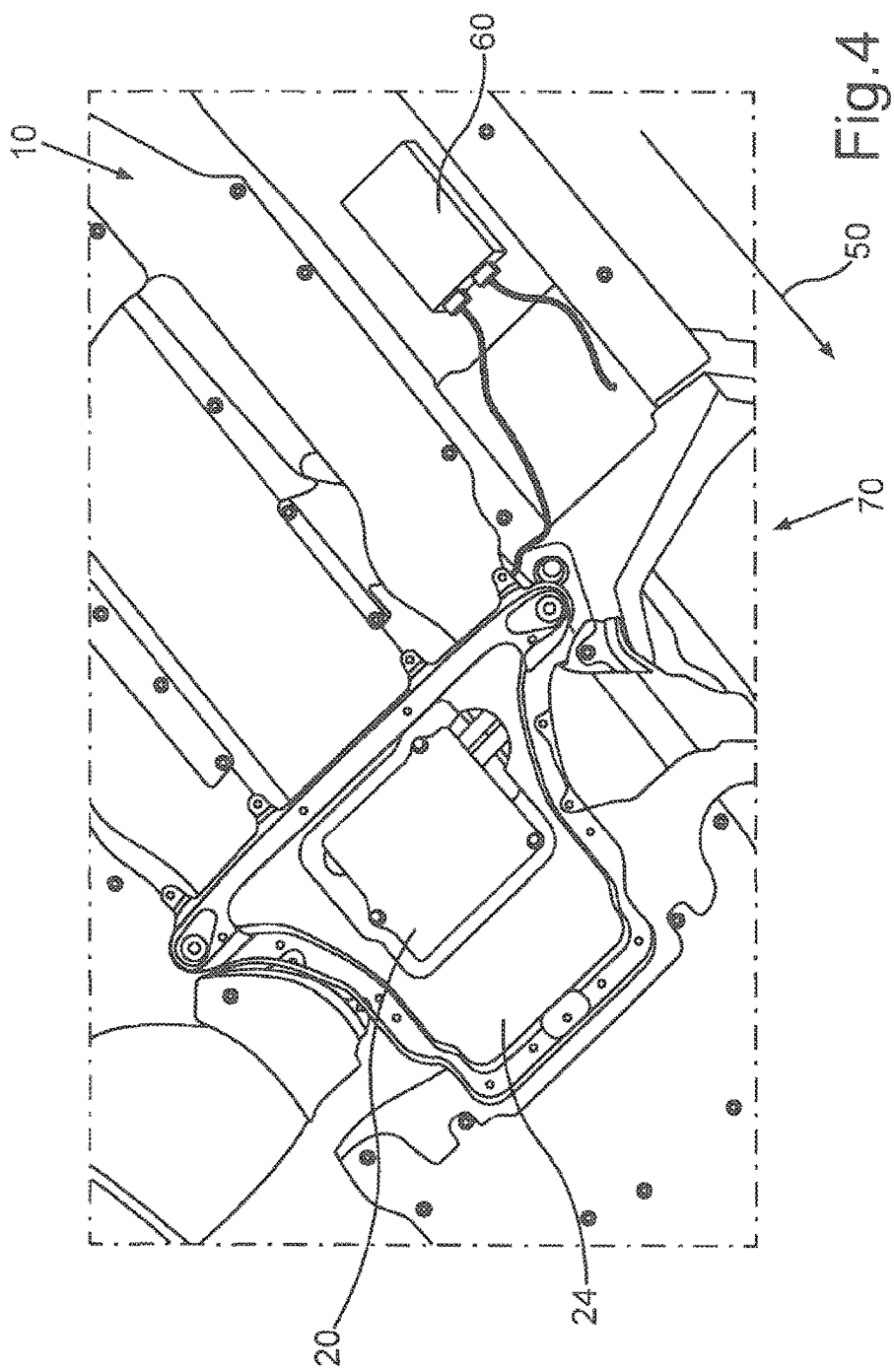

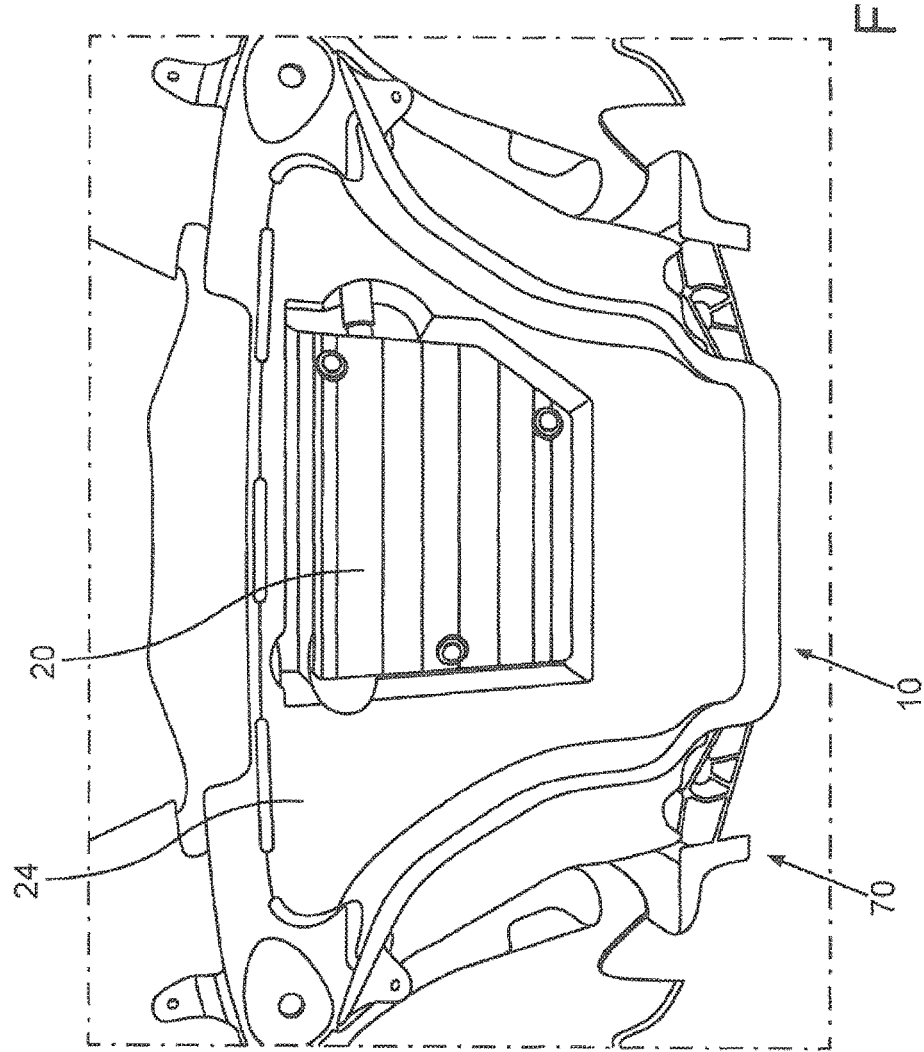

ARRANGEMENT OF AN INDUCTION COIL ON AN UNDERBODY OF A MOTOR VEHICLE

CROSS REFERENCE TO RELATED APPLICATIONS

This application is a continuation of PCT international Application No. PCT/EP2014/077191, filed Dec. 10, 2014, which claims priority under 35 U.S.C. § 119 from German Patent Application No. 10 2013 226 830.0, filed Dec. 20, 2013, the entire disclosures of which are herein expressly incorporated by reference.

BACKGROUND AND SUMMARY OF THE INVENTION

The invention relates to arrangement of at least one induction coil for inductively charging an energy accumulator on an underbody of a motor vehicle.

Induction coils of this type are particularly readily suitable for contactless charging, for example, of a vehicle battery (energy accumulator), wherein all that is required is to place the motor vehicle for a relatively long period of time over a charging device emitting a changing magnetic field, in order to charge the energy accumulator. Charging devices of this type can be provided, for example, in public car parks, wherein defined parking times of motor vehicles equipped with such an induction coil are used in order to charge the energy accumulator (vehicle battery) while the motor vehicle is parked. Specifically in comparison to the refueling operation when refueling motor vehicles with fossil fuels, advantages then arise to the effect that no special gasoline station has to be found in order at least partially to fill the energy accumulator, and also to the effect that the charging of the energy accumulator takes place in a contactless manner and, accordingly, can proceed particularly ergonomically and without further action by the driver. Furthermore, specifically in contrast to refueling with fossil fuels, during the refueling operation or during the charging of the energy accumulator no fuel vapors are released and, accordingly, a particularly large contribution is made to environmental protection or to protection of health. For example, it is known that hydrocarbon compounds customarily released during the refueling operation with fossil fuels may rise in the form of gasoline vapors or diesel vapors, wherein vapors of this type can be classified as environmentally harmful or carcinogenic.

The induction coil, which is arranged on the underbody, of motor vehicles of this type designed for inductive charging is also referred to as a "secondary coil" or as a "car pad module (CPM)". If the motor vehicle is now parked over a charging device for inductively charging the energy accumulator of the motor vehicle, a "primary coil" of the charging device is brought up to the secondary coil, which secondary coil is arranged on the underbody of the motor vehicle, and is oriented relative to the secondary coil. A magnetic field that changes at a defined frequency is built up by means of the primary coil. By way of this changing magnetic field and with the interposition of the secondary coil, the energy accumulator (vehicle battery or high voltage battery) of the motor vehicle is charged. The closer the primary coil is brought up to the secondary coil of the motor vehicle, or the more exactly the primary coil is oriented relative to the secondary coil, the more efficient is also the charging operation.

It is the object of the present invention to provide an arrangement of the type mentioned at the beginning, in which an efficient charging operation is made possible even in the event of an increased distance between the secondary coil and the primary coil, and in the event of a less exact orientation of the primary coil relative to the secondary coil.

This and other objects are achieved by an arrangement of at least one induction coil for inductively charging an energy accumulator on an underbody of a motor vehicle, wherein the induction coil is at least partially covered on a downward side in the vertical direction of the vehicle by at least one covering element.

In order to provide an arrangement, by which effective charging is permitted even with an increased distance or less exact orientation of the primary coil relative to the second coil, it is provided according to the invention that the induction coil is at least partially covered on a downward side in the vertical direction of the vehicle by at least one covering element.

It can be avoided by means of the covering element that the induction coil of the motor vehicle, i.e. the secondary coil, is damaged while traveling. Such damage may otherwise occur, for example, due to an external action on poor sections of a road, or from relatively large amounts of spray water (or salt-containing water in winter) that reaches the electronic components, such as the induction coil. Therefore, the covering element avoids damage to the induction coil or disadvantageously affecting or impairing the stray field of the induction coil as a consequence of, for example, the impact of objects, such as stones or branches striking against the underbody of the vehicle. The efficiency during charging of the energy accumulator (high voltage battery, battery) can therefore be maintained particularly substantially over the service life of the vehicle by the covering element since possible damage or effects of spray water on the induction coil is effectively prevented by use of the covering element.

The covering element can be formed, for example, from a glass fiber plastic, as a result of which the magnetic field is minimally disturbed during the inductive charging although the covering element is arranged between the induction coil (secondary coil) of the motor vehicle and the primary coil. The efficiency of the charging operation can even be further improved by, for example, a field-guiding region with respective field-guiding elements being arranged on the covering element, wherein said field-guiding elements correspond to "ferrites". For example, a defined region (field-guiding region) of the covering element is designed to a particular extent to orient the magnetic field in an optimum manner in terms of efficiency during the inductive charging, wherein, in addition to the magnetic field, an electric field which is associated with the buildup of the magnetic field is also positively influenced. However, the covering element may also be used for the merely partial covering of the induction coil of the motor vehicle and may have, for example, an open frame region into which the primary coil is inserted during charging and is locked, i.e. oriented, par rapidly and exactly relative to the induction coil of the motor vehicle. This leads to the inductive charging being able to take place particularly rapidly and, accordingly, particularly large savings on time can be obtained since an orientation aid for the orientation of the primary coil is provided by the open frame. When the induction coil is partially covered by the covering element, i.e. for example, by using such an open frame, which then, for example, protrudes downward beyond the induction coil, i.e. toward the contact area of the motor vehicle, the impact of damaging objects or a possible action of spray water on the induction coil of the motor vehicle can be at least substantially prevented, wherein, at the same time, the primary coil can be oriented particularly rapidly with respect to the secondary coil.

Further advantages, features and details of the invention emerge from the description below of a preferred exemplary embodiment and with reference to the drawings. The features and combinations of features mentioned above in the description and the features and combinations of features which are mentioned below in the description of the figures and/or are shown solely in the figures are usable not only in the respectively stated combination, but also in other combinations or on their own without departing from the scope of the invention.

BRIEF DESCRIPTION OF THE DRAWINGS

FIG. 4 is a partial bottom view of the underbody of the motor vehicle, on which the underbody protection element is fixed in order to protect respective components of the motor vehicle; and FIG. 5 is a further partial bottom view of the underbody of the motor vehicle, wherein the induction coil is not concealed here by the covering element.

DETAILED DESCRIPTION OF THE DRAWINGS

Figure 1A:
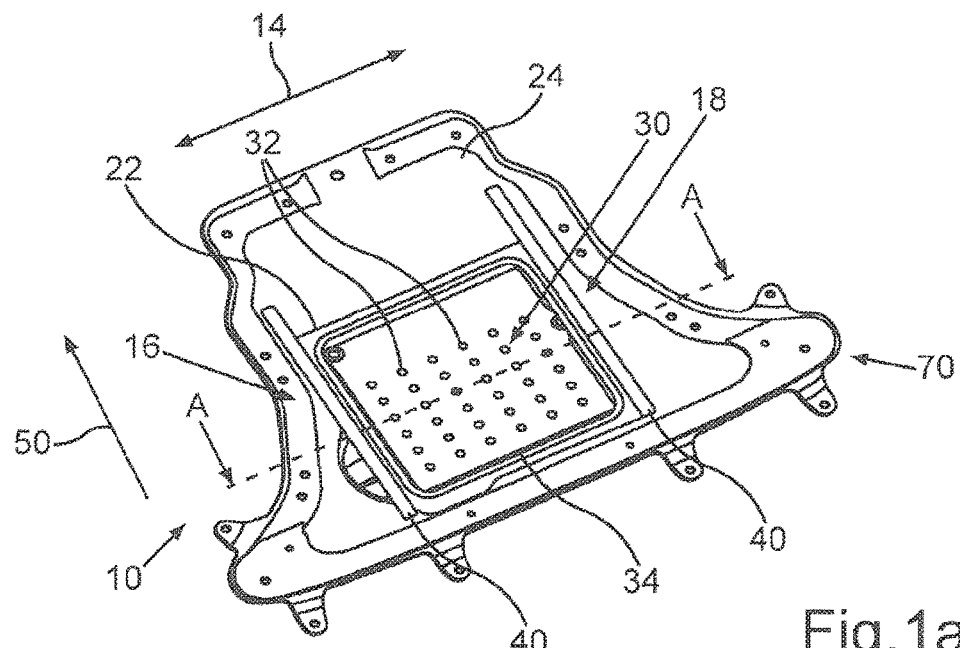
FIG. 1a is a perspective bottom view of an underbody of a motor vehicle, of which only an underbody protection element and a covering element covering an induction coil are shown here, wherein the covering element is formed from glass fiber reinforced plastic (GFRP)

FIG. 1a shows, in a bottom view, an underbody protection element 24 which is part of an underbody 10 of a motor vehicle. The underbody protection element 24 is referred to in the case of two-wheel-driven motor vehicles (with a driven axle) as an "engine shield" and, in the case of four-wheel-driven motor vehicles (all-wheel drive), as a shear panel. Due to increased stability requirements in the case of all-wheel-operated motor vehicles, the underbody protection element 24 in the form of a shear panel is of more solid design than the engine shield.

Figure 1B:
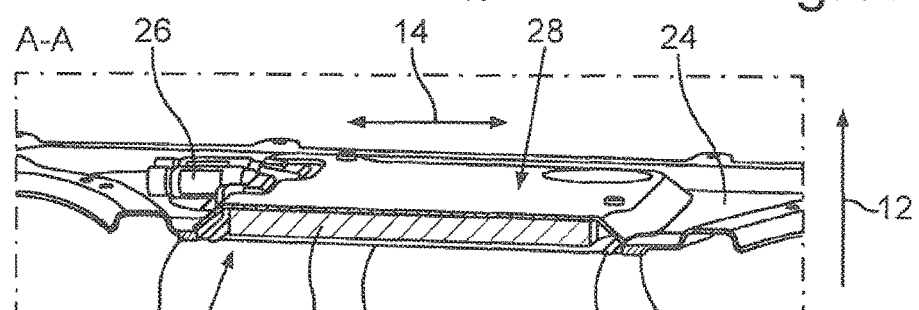
FIG. 1b is a sectional view according to a section line A-A from FIG. 1a of the underbody protection element.
Figure 1C:
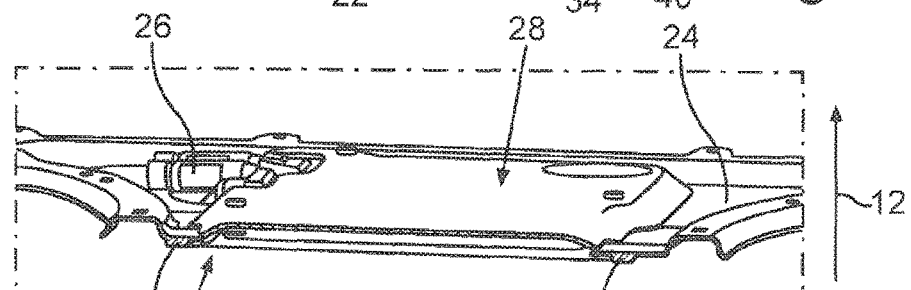
FIG. 1c is a further sectional view in which the induction coil has been omitted here and, accordingly, a receiving region accommodating the induction coil can be seen.
Figure 2:
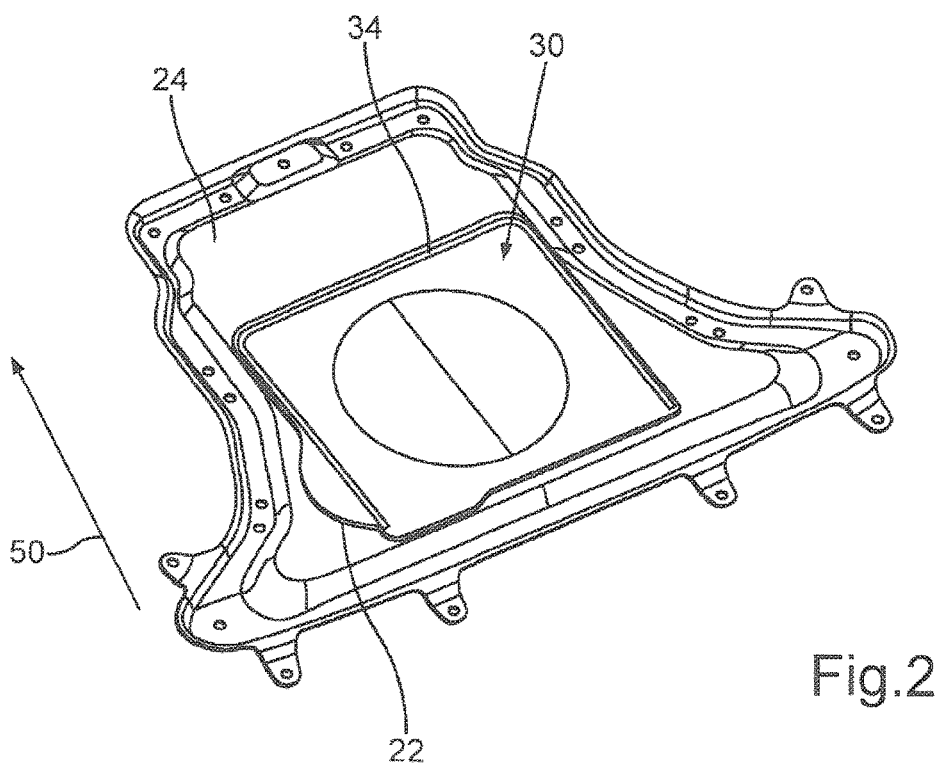
FIG. 2 is a further perspective bottom view of the underbody protection element and of the covering element which is bordered here by a frame.

FIG. 1b and FIG. 1c both show sectional views according to a section line A-A shown in FIG. 1a. It can be seen above all with reference to FIG. 1b that, on the underbody 10 of the motor vehicle, an induction coil 20 is covered on a downward side in the vertical direction 12 of the vehicle by a covering element 22. The induction coil 20 is also referred to as a car pad module (CPM). The induction coil 20 here is completely covered by the covering element 22, but it is also contemplated for the induction coil 20 to be covered only in regions by the covering element 22. The induction coil 20 is a "secondary coil" which is permanently carried along by the motor vehicle and which is used to charge an energy accumulator (not illustrated further here), for example a high voltage battery for supplying the energy for an electric motor driving the motor vehicle, by induction via a primary coil (likewise not illustrated) which is brought up to the motor vehicle from below and is oriented at least substantially congruently with the induction coil 20.

The induction coil 20 is adjoined by the underbody protection element 24, wherein the underbody protection element 24 at least partially bounds a receiving region 28 in which the induction coil 20 is accommodated. The receiving region 28 corresponds here to a passage opening or a trough with a floor panel or other flat material on which the induction coil 20 is fixed. By means of the underbody protection element 24, respective components 26 of the motor vehicle can be protected against wet or foreign bodies, such as, for example, stones or branches, or from the impaction thereof and resulting damage. The components 26 include, for example, voltage rectifiers, transformers or other vehicle components which should be protected against damage. The covering element 22 is arranged on the underbody protection element 24 and covers the receiving region 28 from below in the vertical direction 12 of the vehicle.

The underbody protection element 24 has a field-guiding region 30 with respective field-guiding elements 32 for intensifying and orienting a magnetic field during the inductive charging. The field-guiding elements 32 are indicated here by means of a circular contour, but it is clear that the field-guiding elements 32, which have respective ferrites, can also have other contours. By way of the special arrangement of the ferrites or the field-guiding elements 32, particularly favorable transmissivity of six-dimensional electromagnetic fields can be achieved. Said six dimensions are composed, firstly, of the changing magnetic field and, secondly, of an electric field which likewise occurs during the inductive charging. In other words, the charging of the energy accumulator (high voltage battery), not illustrated here, of the motor vehicle is considerably improved in respect of the charging efficiency using the field-guiding elements 32 which are distributed over the field-guiding region 30, which extends flat over the covering element 22. By use of the field-guiding elements 32 (ferrites), the induction coil 20 (secondary coil) can therefore be acted upon inductively in a particularly favorable manner and with great charging efficiency with a particularly exactly oriented electromagnetic field by way of the primary coil (not illustrated).

It is furthermore shown in FIG. 1a, FIG. 1b and FIG. 1c that, on the respectively opposite sides 16, 18 of the underbody protection element 24 in the transverse direction 14 of the vehicle, respective runners 40 projecting downward beyond the underbody protection element 24 in the vertical direction 12 of the vehicle are arranged on the underbody 10. In other words, the runners 40 are therefore at a smaller distance from the underlying surface (not illustrated here) of the motor vehicle 70 than the covering element 22. If, for example, the ramp angle of a slight rise, which is intended to be scaled by the motor vehicle 70, is of such a size that the underbody 10 of the motor vehicle 70 comes into contact with the underlying surface, it is avoided by means of the runners 40, which project both over the underbody protection element 24 and over the covering element 22, that the underbody protection element 24 and the covering element 22 come into contact with the underlying surface. By use of the runners 40 which are oriented in the direction of travel 50, damage to the covering element 22 or to the underbody protection element 24 is therefore avoided by the runners 40 serving as it were as spacers between the underlying surface and the covering element 22 or the underbody protection element 24. It is clear that the runners 40 extend along the opposite sides 16, 18 of the underbody protection element 24 in the longitudinal direction of the vehicle since the runners 40 permit the motor vehicle 70 to slide on the underlying surface in the direction of travel 50 if the underbody 10 of the motor vehicle 70 comes into contact with the underlying surface.

Figure 3A:
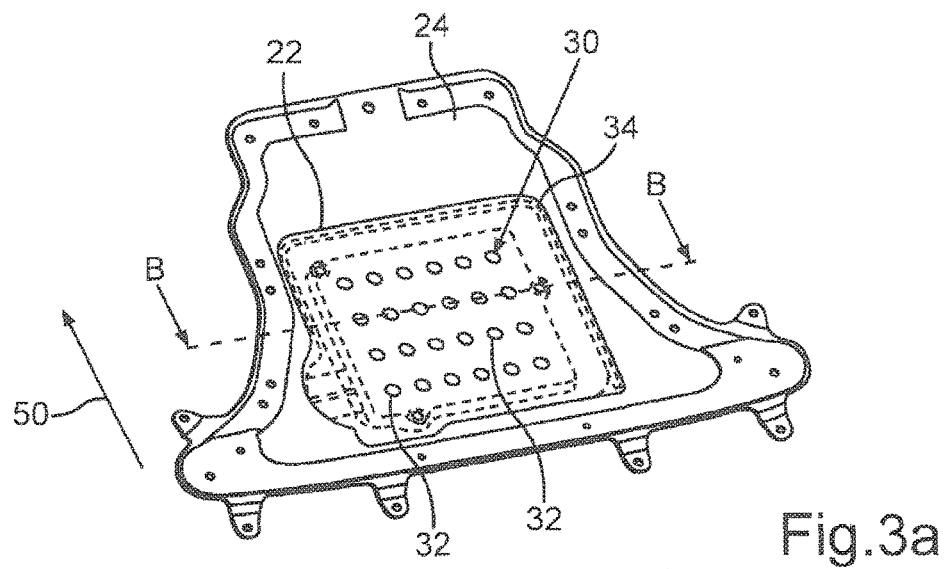
FIG. 3a is a further perspective bottom view of the underbody protection element and of the covering element which here has afield-guiding region with field-guiding elements in the form of ferrites.
Figure 3B:
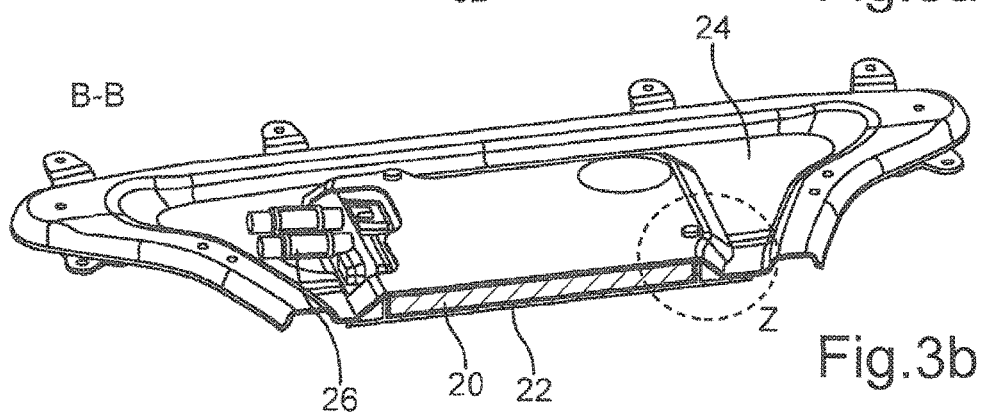
FIG. 3b is a sectional view of the underbody protection element 24, which is shown in FIG. 3a, according to a section line B-B.
Figure 3C:
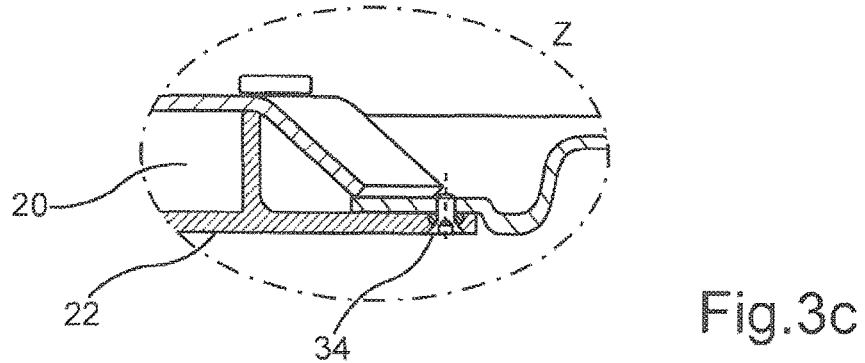
FIG. 3c is an enlarged detailed view, which is shown in a sectional view, according to a region Z, which is encircled in FIG. 3b, of the underbody protection element 24.

It can be seen with reference to FIG. 2, FIG. 3a, FIG. 3b and FIG. 3c that the covering element 22 is accommodated by a frame 34 surrounding the covering element 22 at least in regions. FIG. 3b shows a sectional illustration of the underbody protection element 24 according to a section line B-B in FIG. 3a. FIG. 3c shows a detailed view in a sectional illustration according to a region Z which is marked in FIG. 3b.

The frame 34 may firstly be designed as a metal frame (for example aluminum frame) which is integrated in the covering element 22, or else alternatively may be formed from a steel cable. Irrespective of whether the frame 34 is designed as a metal frame or as a steel cable or metallic cable, the frame 34, as can be seen in FIG. 3a, can be formed partially encircling the edge region of the covering element 22, or alternatively can form a closed profile. The frame 34, which can be placed both onto the outside of the covering element 22 and can be integrated into the material of the covering element 22, serves here as additional protection and therefore as a stabilizer of the covering element 22, or of the induction coil located therebelow, against damage in the event of contact with the underlying surface. It is clear that the frame 34 can be arranged in addition or alternatively to the runners 40 on the underbody 10 of the motor vehicle 70. If the frame 34 is designed as a steel cable, particularly good protection of the induction coil 20 against pointed objects which may tear open the underbody 10 of the motor vehicle 70 arises. This particularly good protection is now produced by the fact that the pointed object tears the frame 34, i.e. the steel cable, as a result of which the steel cable is pulled through the material of the covering element 22 and therefore the energy of deformation which occurs because of the movement of the pointed object relative to the underbody 10 of the motor vehicle 70 is distributed over a particularly large area of the covering element 22. In other words, instead of a deep and narrow tear by the pointed object, abrasion which is significantly less deep and is thus distributed over a more extensive area of the covering element 22 is therefore brought about. If, as in this exemplary embodiment, the covering element 22 is formed from a glass fiber reinforced plastic (GFRP), the energy of deformation which occurs can be distributed over a particularly large area since GFRP can be manufactured as anisotropic material in such a manner that there is a different resistance in relation to deformation in the direction of travel 50 than in the transverse direction 14 of the vehicle.

FIG. 4 and FIG. 5 both show further bottom views of the underbody 10 of the motor vehicle 70. The induction coil 20 is screwed here via a three-point mounting on the shear panel (underbody protection element 24) to the "front section" of the motor vehicle 70. A wireless control unit (WCU) 60 is fixed on the passenger side and can be used to enable the inductive charging operation and therefore the induction coil 20 can be activated for a charging operation, or the charging operation can be refused. It is clear that the WCU 60 could also be integrated into the induction coil 20 and accordingly could likewise be protected by the covering element 22. The WCU 60 therefore serves as anti-theft protection since the inductive charging can therefore be effectively prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle underbody arrangement, comprising:
   an induction coil configured to inductively charge an energy accumulator, the induction coil being arranged on an underbody of a motor vehicle;
   a covering element configured to at least partially cover the induction coil on a downward side in a vertical direction of the motor vehicle; and
   an underbody protection element adjoining the induction coil, the underbody protection element being configured to protect at least one component other than the induction coil of the motor vehicle,
   wherein at least a portion of the induction coil is disposed between the underbody protection element and the covering element.

2. The arrangement according to claim 1, wherein the underbody protection element at least partially bounds a receiving region in which the induction coil is at least partially accommodated.

3. The arrangement according to claim 2, wherein the covering element is arranged on the underbody protection element.

4. The arrangement according to claim 3, wherein the receiving region is at least partially covered downward in the vertical direction of the motor vehicle by the covering element.

5. The arrangement according to claim 2, wherein the receiving region is at least partially covered downward in the vertical direction of the motor vehicle by the covering element.

6. A vehicle underbody arrangement, comprising:
   an induction coil configured to inductively charge an energy accumulator, the induction coil being arranged on an underbody of a motor vehicle;
   a covering element configured to at least partially cover the induction coil on a downward side in a vertical direction of the motor vehicle; and
   an underbody protection element adjoining the induction coil, the underbody protection element being configured to protect at least one component of the motor vehicle, wherein
   the underbody protection element at least partially bounds a receiving region in which the induction coil is at least partially accommodated and
   the underbody protection element has at least one field-guiding region with respective field-guiding elements that intensify and orient a magnetic field during inductive charging.

7. The arrangement according to claim 4, wherein the underbody protection element has at least one field-guiding region with respective field-guiding elements that intensify and orient a magnetic field during inductive charging.

8. The arrangement according to claim 6, wherein the field-guiding elements comprise ferrites.

9. A vehicle underbody arrangement, comprising:
   an induction coil configured to inductively charge an energy accumulator, the induction coil being arranged on an underbody of a motor vehicle;
   a covering element configured to at least partially cover the induction coil on a downward side in a vertical direction of the motor vehicle;
   an underbody protection element adjoining the induction coil, the underbody protection element being configured to protect at least one component of the motor vehicle, wherein the underbody protection element at least partially bounds a receiving region in which the induction coil is at least partially accommodated; and
   runners arranged on opposite sides of the underbody protection element in a transverse direction of the motor vehicle, the runners being configured to project downward beyond the underbody protection element in the vertical direction of the vehicle.

10. The arrangement according to claim 7, further comprising:
    runners arranged on opposite sides of the underbody protection element in a transverse direction of the motor vehicle, the runners being configured to project downward beyond the underbody protection element in the vertical direction of the vehicle.

11. The arrangement according to claim 9, wherein the runners extend along the opposite sides of the underbody protection element in a longitudinal direction of the vehicle.

12. The arrangement according to claim 1, wherein the covering element is accommodated by a frame that surrounds the covering element at least in regions.

\* \* \* \* \*